(12) United States Patent
Keinan et al.

(10) Patent No.: US 11,674,639 B2
(45) Date of Patent: Jun. 13, 2023

(54) DEVICES, SYSTEMS AND METHODS FOR MONITORING LUBRICATION OF A TOOL

(71) Applicant: GREAZLY LUBRICATION MONITORING LTD, Eshtaol (IL)

(72) Inventors: Aviv Keinan, Ramat Aviv (IL); Amir Schwartz, Eshtaol (IL)

(73) Assignee: GREAZLY LUBRICATION MONITORING LTD, Eshtaol (IL)

( * ) Notice: Subject to any disclaimer, the term of this patent is extended or adjusted under 35 U.S.C. 154(b) by 0 days.

(21) Appl. No.: 17/961,042

(22) Filed: Oct. 6, 2022

(65) Prior Publication Data

US 2023/0123102 A1 Apr. 20, 2023

Related U.S. Application Data

(60) Provisional application No. 63/256,648, filed on Oct. 18, 2021.

(51) Int. Cl.
*F16N 29/02* (2006.01)

(52) U.S. Cl.
CPC .......... *F16N 29/02* (2013.01); *F16N 2250/04* (2013.01)

(58) Field of Classification Search
CPC ....... F16N 29/02; F16N 2250/04; F16N 21/02
USPC ................................................ 184/7.4, 105.3
See application file for complete search history.

(56) References Cited

U.S. PATENT DOCUMENTS

| | | | |
|---|---|---|---|
| 5,381,874 A * | 1/1995 | Hadank | F16N 29/02 184/6 |
| 5,478,977 A | 12/1995 | Beasley | |
| 6,271,761 B1 * | 8/2001 | Smith | F16C 33/6622 340/682 |
| 9,200,979 B2 | 12/2015 | Goodman et al. | |
| 9,291,203 B2 * | 3/2016 | Lewis | G01K 13/02 |
| 10,139,302 B2 * | 11/2018 | Osawa | G01L 19/142 |
| 10,254,270 B2 * | 4/2019 | Potyrailo | G01N 33/2888 |
| 2007/0137936 A1 * | 6/2007 | Akechi | G01P 13/0033 184/14 |
| 2012/0247876 A1 * | 10/2012 | Kreutzkamper | F16N 7/385 184/14 |

(Continued)

OTHER PUBLICATIONS

Johnson, Jason Eric, "Identifying Common Ultrasonic Predictive Failure Signatures in Bearing Elements for the Development of an Automated Condition Based Ultrasonic Monitoring Controller." (2005). *Electronic Theses and Dissertations*. Paper 1097. https://dc.etsu.edu/etd/1097.

(Continued)

*Primary Examiner* — Michael R Mansen
*Assistant Examiner* — Mark K Buse
(74) *Attorney, Agent, or Firm* — Pearl Cohen Zedek Latzer Baratz LLP

(57) ABSTRACT

A device for monitoring a lubrication of a tool may include: a housing including: a lubricator connector configured to connect the housing to a lubricator and including a lubricant inlet opening, a chamber configured to receive a lubricant from the lubricator through the lubricant inlet opening, a tool connector configured to connect the housing to a lubricant fitting of a tool and including a lubricator outlet opening through which the lubricant leaves the chamber; and a pressure transducer configured to measure a lubricant pressure in the chamber of the housing and generate an output pressure signal related thereto.

19 Claims, 7 Drawing Sheets

(56) References Cited

U.S. PATENT DOCUMENTS

2013/0161130 A1* 6/2013 Alexander .............. F16N 13/14
184/32
2020/0116302 A1* 4/2020 Glass ...................... F16N 11/00

OTHER PUBLICATIONS

Mark A Goodman; Ultrasonic Tips on Monitoring Bearings for Proper Lubrication and Wear; Jun. 2021.
https://www.perma-tec.com/en/products/single-point-lubrication-systems-electromechanical/perma-ultra/ Jun. 2021.
https://www.easylube.com/en/software-skymonitor.html?v=6.1.8, Jun. 2021.
https://www.uesystems.com/ontrak-smartlube/ Jun. 2021.
https://evolution.skf.com/a-cloud-with-a-smooth-lining/ https://evolution.skf.com/a-cloud-with-a-smooth-lining/ Jun. 2021.

* cited by examiner

DEVICES, SYSTEMS AND METHODS FOR MONITORING LUBRICATION OF A TOOL

CROSS REFERENCE TO RELATED APPLICATIONS

This application claims the benefit of U.S. Provisional Patent Application No. 63/256,648 filed on Oct. 18, 2021, which is hereby incorporated by reference.

FIELD OF THE INVENTION

The present invention relates to the field of devices, systems and methods for monitoring lubrication of a tool, and more particularly, to devices, systems and methods for monitoring lubrication of a tool based on lubricant pressure measurements.

BACKGROUND OF THE INVENTION

Tool containing moving parts requires periodic and/or continuous lubrication. In some cases, the lubrication may be performed manually using manual lubricators. In other cases, the lubrication may be performed automatically using automatic lubricators. Failure to supply lubricant to a tool containing moving parts may cause damage to the tool. There is a long-felt need in devices, systems and methods for monitoring lubrication of tools containing moving parts.

SUMMARY OF THE INVENTION

Some embodiments of the present invention may provide a device for monitoring a lubrication of a tool, the device may include: a housing including: a lubricator connector configured to connect the housing to a lubricator and including a lubricant inlet opening, a chamber configured to receive a lubricant from the lubricator through the lubricant inlet opening, a tool connector configured to connect the housing to a lubricant fitting of a tool and including a lubricator outlet opening through which the lubricant leaves the chamber; and a pressure transducer configured to measure a lubricant pressure in the chamber of the housing and generate an output pressure signal related thereto.

In some embodiments, the device may further include a controller configured to determine, based on the output pressure signal, an abnormal lubrication of the tool by the lubricator.

In some embodiments, the controller is configured to determine, based on the output pressure signal, a lack of the lubricant supply from the lubricator if the lubricant pressure being measured in the chamber is below a predetermined first pressure value.

In some embodiments, the housing is configured to maintain the lubricant pressure in the chamber above the first pressure value if the lubricant is being supplied to the chamber.

In some embodiments, the housing may include a valve assembly to control a supply of the lubricant into the chamber through the lubricant inlet opening and to maintain the lubricant pressure in the chamber above the first pressure value if the lubricant is being supplied to the chamber.

In some embodiments, the valve assembly may include a spring-loaded valve, wherein a spring of the valve assembly is preloaded to control the supply of the lubricant into the chamber through the lubricant inlet opening and to maintain the lubricant pressure in the chamber above the first pressure value if the lubricant is being supplied to the chamber.

In some embodiments, the chamber may include a plurality of channels formed through the housing and fluidically interconnecting the lubricant inlet opening, the lubricant outlet opening and an opening through which the pressure transducer is inserted into the chamber.

In some embodiments, the plurality of channels may include: a first channel extending through housing from the lubricant inlet opening towards the opening through which the pressure transducer is inserted into the chamber; a second channel being substantially parallel to and distanced from the first channel; a third channel being substantially perpendicular to and interconnecting the second channel and the first channel; and a fourth channel being substantially perpendicular to the second channel and connecting the second channel to the lubricant outlet opening.

In some embodiments, the device may further include a communication unit configured to: send, to a remote computing device, multiple lubricant pressure values measured in the chamber of the housing during a specified time interval, and receive, from the remote computing device, the first pressure value.

In some embodiments, the controller is configured to determine, based on the output pressure signal, a blockage of the lubricant fitting in the tool if the lubricant pressure being measured in the chamber is above a predetermined second pressure value.

In some embodiments, the controller is configured to determine, based on the output pressure signal, abnormal values of the lubricant pressure being measured in the chamber of the housing.

In some embodiments, the controller is configured to determine, based on the output pressure signal, an abnormal time variation pattern of the lubricant pressure being measured in the chamber of the housing.

In some embodiments, the device may further include a communication unit configured to send to one or more authorized parties one or more notifications concerning the determination of the abnormal lubrication of the tool.

In some embodiments, the tool connector of the housing is configured to sense ultrasonic waves/vibrations generated by the tool.

In some embodiments, the device may further include: an ultrasonic waveguide connected to the tool connector and configured to guide the ultrasonic waves/vibrations being sensed by the tool connector, and an ultrasonic transducer connected to the ultrasonic waveguide and configured to receive the ultrasonic waves/vibrations being sensed by the tool connector and generate an ultrasonic output signal related thereto.

In some embodiments, the device may further include a controller configured to determine, based on the output ultrasonic signal, an abnormal operation of the tool.

In some embodiments, the controller is configured to determine, based on the output ultrasonic signal, abnormal amplitudes of the ultrasonic waves/vibrations being generated by the tool.

In some embodiments, the controller is configured to determine, based on the output ultrasonic signal, an abnormal time variation pattern of the ultrasonic waves/vibrations being generated by the tool.

In some embodiments, the device may further include a communication unit configured to send to one or more authorized parties one or more notifications concerning the determination of the abnormal operation of the tool.

In some embodiments, the device may further include one or more additional sensors connected to the housing, the one or more additional sensors being configured to measure one or more parameters and generate one or more sensor signals related thereto.

In some embodiments, the device may further include: a rechargeable power source to supply power to electrical components of the device, and an energy harvesting unit to charge the rechargeable power source.

In some embodiments, the energy harvesting unit may include: a piezoelectric element connected to the housing and configured to: deform in response to vibrations being generated by the tool, and generate an electric charge related thereto, and an electrical circuit connected to the piezoelectric element and to the power source and configured to convert the electrical charge to a voltage to recharge the power source.

In some embodiments, the energy harvesting unit may include: a piezoelectric element at least partly positioned within the chamber of the housing and configured to: deform in response to the lubricant pressure within the chamber, and generate an electric charge related thereto, and an electrical circuit connected to the piezoelectric element and to the power source and configured to convert the electrical charge to a voltage to recharge the power source.

Some embodiments of the present invention may provide a method of monitoring a lubrication of a tool, the method may include: connecting a device to a lubricator; connecting the device to a lubricant fitting of a tool; measuring, by the device, a lubricant pressure within the device and generating an output pressure signal related thereto; and determining, based on the output pressure signal, an abnormal lubrication of the tool by the lubricator.

Some embodiments may further include determining the abnormal lubrication of the tool by a controller of the device.

Some embodiments may further include: sending, by the device, the output pressure signal to a remote computing device; and determining, by the remote computing device, based on the output pressure signal, the abnormal lubrication of the tool.

Some embodiments may further include determining the abnormal lubrication of the tool by the lubricator based on the output pressure signal using one or more pre-trained AI models.

Some embodiments may further include determining, based on the output pressure signal, abnormal values of the lubricant pressure being measured by the device.

Some embodiments may further include determining, based on the output pressure signal, an abnormal time variation pattern of the lubricant pressure being measured by the device.

Some embodiments may further include sending to one or more authorized parties one or more notifications concerning the determination of the abnormal lubrication of the tool by the lubricator.

Some embodiments may further include: sensing, by the device, ultrasonic waves/vibrations generated by the tool and generating an ultrasonic output signal related thereto; and determining, based on the output ultrasonic signal, an abnormal operation of the tool.

Some embodiments may further include determining the abnormal operation of the tool by a controller of the device.

Some embodiments may further include: sending, by the device, the output ultrasonic signal to a remote computing device; and determining, by the remote computing device, based on the output ultrasonic signal, the abnormal operation of the tool.

Some embodiments may further include determining the abnormal operation of the tool by the lubricator based on the output ultrasonic signal using one or more pre-trained AI models.

Some embodiments may further include determining, based on the output ultrasonic signal, abnormal amplitudes of the ultrasonic waves/vibrations being sensed by the device.

Some embodiments may further include determining, based on the output ultrasonic signal, an abnormal time variation pattern of the ultrasonic waves/vibrations being sensed by the device.

Some embodiments may further include sending to one or more authorized parties one or more notifications concerning the determination of the abnormal operation of the tool.

Some embodiments may further include: measuring, by the device, one or more parameters and generating one or more signals related thereto; and determining, based on the one or more output signals, one or more abnormal parameter values.

Some embodiments may further include sending to one or more authorized parties one or more notifications concerning the determination of the one or more abnormal parameter values.

Some embodiments may further include harvesting energy by the device from at least one of the lubricator and the tool to charge a rechargeable power source of the device.

Some embodiments of the present invention may provide a system for monitoring a lubrication of a tool, the system may include: a device configured to be connected to a lubricator and to a tool, the device is further configured to: receive a lubricant from the lubricator, and measure a lubricant pressure within the device and generate an output pressure signal related thereto; and a remote computing device configured to: receive the output pressure signal from the device, and determine, based on the output pressure signal, using one or more pre-trained artificial intelligence (AI) models, an abnormal lubrication of the tool by the lubricator.

In some embodiments, the remote computing device is further configured to determine, based on the output pressure signal, abnormal values of the lubricant pressure being measured by the device.

In some embodiments, the remote computing device is further configured to determine, based on the output pressure signal, an abnormal time variation pattern of the lubricant pressure being measured by the device.

In some embodiments, the remote computing device is further configured to send to one or more authorized parties one or more notifications concerning the determination of the abnormal lubrication of the tool by the lubricator.

In some embodiments, the device is further configured to sense ultrasonic waves/vibrations generated by the tool and generate an ultrasonic output signal related thereto.

In some embodiments, the remote computing device is further configured to: receive the ultrasonic output signal from the device; and determine, based on the output ultrasonic signal, using the one or more pre-trained AI models, an abnormal operation of the tool.

In some embodiments, the remote computing device is further configured to determine, based on the output ultrasonic signal, abnormal amplitudes of the ultrasonic waves/vibrations being sensed by the device.

In some embodiments, the remote computing device is further configured to determine, based on the output ultrasonic signal, an abnormal time variation pattern of the ultrasonic waves/vibrations being sensed by the device.

In some embodiments, the remote computing device is further configured to send to one or more authorized parties one or more notifications concerning the determination of the abnormal operation of the tool.

In some embodiments, the device is further configured to measure one or more parameters and generate one or more signals related thereto.

In some embodiments, the remote computing device is further configured to: receive the one or more signals from the device; and determine, based on the one or more signals, using the one or more pre-trained AI models, one or more abnormal parameter values.

In some embodiments, the remote computing device is further configured to send to one or more authorized parties one or more notifications concerning the determination of the one or more abnormal parameter values.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
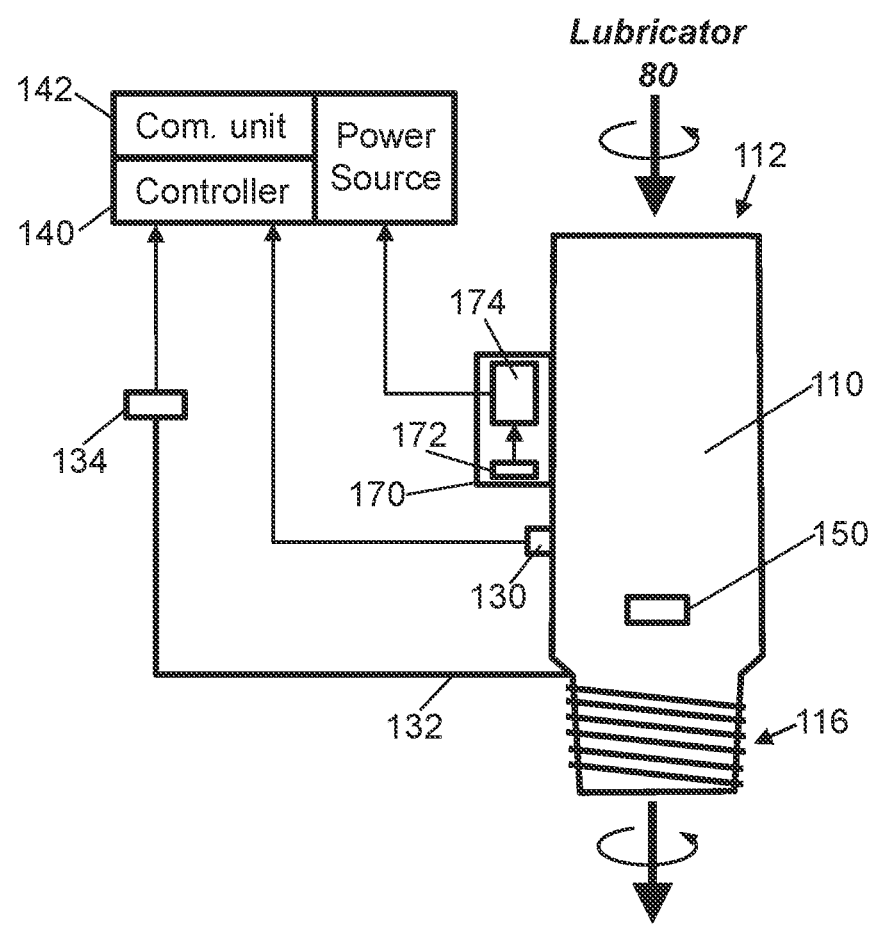
FIG. 1A is schematic illustration of a lubrication monitoring device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device (e.g. such as computing device 500 described below with respect to FIG. 5), that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Some embodiments of the present invention may provide a device for monitoring lubrication (e.g. greasing) of a tool containing moving parts. The device may include a housing including a lubricator connector configured to connect the housing to a lubricator, a chamber configured to receive lubricant from the lubricator, and a tool connector configured to connect the housing to a lubricant fitting of a tool. The device may be used with manual lubricators, automatic lubricators, single point lubricators, multipoint lubricators or any other lubricators known in the art. The lubricant may include oils, greases or any other suitable substance known in the art.

In some embodiments, the device may include a pressure transducer configured to measure the lubricant pressure in the chamber of the housing and generate a signal related thereto (the "output pressure signal").

In some embodiments, the tool connector of the housing may be configured to sense (e.g., continuously sense) ultrasonic vibrations/waves generated by the tool. The device may further include an ultrasonic waveguide connected to the tool connector and configured to guide the ultrasonic vibrations/waves being sensed by the tool connector, and an ultrasonic transducer connected to the ultrasonic waveguide and configured to generate a signal related to the vibrations/waves being sensed by the tool connector (the "output ultrasonic signal").

The output pressure signal and/or the output ultrasonic signal may be used to determine an abnormal lubrication of the tool by the lubricator (e.g., due to lack of lubricant supply by the lubricator and/or due to blockage of the lubricant fitting of the tool) and/or an abnormal operation of the tool (e.g., due to a wear of the tool).

In various embodiments, the determination of the abnormal lubrication of the tool and/or the abnormal operation of the tool may be made locally on the device. For example, the device may include a controller configured to determine the abnormal lubrication of the tool and/or the abnormal operation of the tool based on the output pressure signal and the output ultrasonic signal, respectively.

In various embodiments, the determination of the abnormal lubrication of the tool and/or the abnormal operation of the tool may be made external to the device. For example, the device may send the output pressure signal and/or the output ultrasonic signal to a remote computing device (e.g., a remote server, a cloud, etc.), and the remote computing device may be configured to determine, e.g., using one or more pre-trained artificial intelligence (AI) models, the abnormal lubrication of the tool and/or the abnormal operation of the tool based on the signals thereof.

Upon determination of the abnormal lubrication of the tool and/or the abnormal operation of the tool, one or more respective notifications may be sent to one or more authorized parties.

Reference is now made to FIG. 1A, which is a schematic illustration of a lubrication monitoring device 100, according to some embodiments of the invention. FIG. 1A schematically shows a side view of device 100.

Figure 1B:
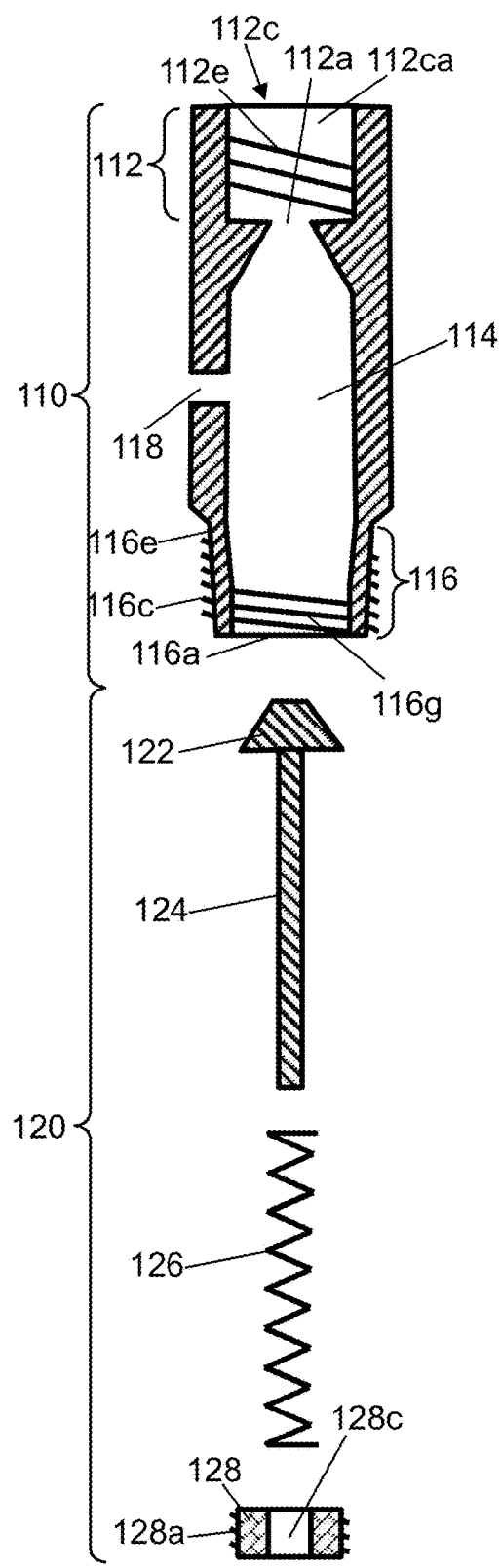
FIGS. 1B and 1C are schematic illustrations of a housing and a valve assembly of the lubrication monitoring device, according to some embodiments of the invention.
Figure 1C:
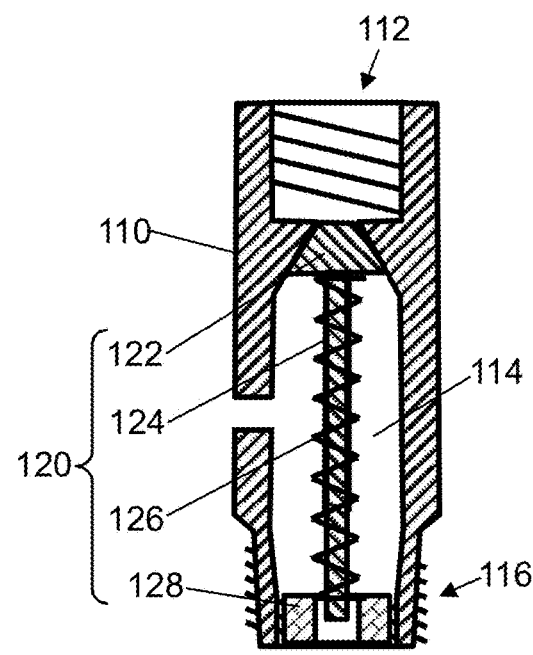

Reference is also made to FIGS. 1B and 1C, which are schematic illustrations of a housing 110 and a valve assembly 120 (shown in FIG. 1B) of a lubrication monitoring device 100, according to some embodiments of the invention. FIG. 1B schematically shows an exploded partial section view of housing 110 and valve assembly 120. FIG. 1C schematically shows partial section view of housing 110 and valve assembly 120.

Device 100 may include a housing 110. Housing 110 may include a lubricator connector 112. Lubricator connector 112 may be configured to connect housing 110 to a lubricator 80. Lubricator connector 112 may include a lubricant inlet opening 112a.

In some embodiments, lubricator connector 112 may include an indent 112c on a distal end of housing 110, and may include an internal thread 112e on a lateral surface 112ca of indent 112c. Internal thread 112e may mate with an external thread on an outlet of lubricator 80 so lubricator 80 may be screwed into lubricator connector 112 of housing 110 to connect lubricator 80 to housing 110.

Housing 110 may include a chamber 114. Chamber 114 may receive a lubricant from lubricator 80 through lubricant inlet opening 112a of lubricator connector 112.

Housing 110 may include a tool connector 116. Tool connector 116 may be configured to connect housing 110 to a lubricant fitting 92 of a tool 90. Tool connector 116 may include a lubricant outlet opening 116a through which the lubricant may leave chamber 114 of housing 110.

In some embodiments, tool connector 116 may be a hollow cylindrical body having an external thread 116c on an outer lateral surface 116e of tool connector 116. External thread 116c of tool connector 116 may mate with an internal thread of the lubricant fitting of tool 90 so tool connector 116 of housing 110 may be screwed into lubricant fitting of tool 90 to connect housing 110 to tool 90.

In some embodiments, housing 110 may be configured to maintain a lubricant pressure in chamber 114 above a first pressure value if the lubricant is being supplied to chamber 114. Maintaining of the lubricant pressure in chamber 114 of housing 110 at the first pressure value may be important for determination of lack of lubricant supply from lubricant 80 in some embodiments of the invention. For example, using the first pressure value as a reference for determination of lack of lubricant supply (e.g., as described hereinbelow) may eliminate, or significantly reduce, an effect of various factors that may affect the lubricant pressure in chamber 114 of housing 110. Such factors may, for example, include resistance of tool 90 to lubricant flow, ambient conditions, etc.

In some embodiments, device 100 may include a valve assembly 120 configured to control the supply of the lubricant into chamber 114 and to maintain the lubricant pressure in chamber 114 above the first pressure value if the lubricant is being supplied to chamber 114. One example of valve assembly 120 is schematically shown in FIGS. 1B and 1C. However, other configurations of valve assembly 120 are also possible.

In some embodiments, valve assembly 120 may include a valve disc 122, a valve stem 124 connected to valve disc 122, a valve spring 126 and a valve insert 128 (e.g., as shown in FIGS. 1B and 1C).

Valve disc 122 may be configured to seal inlet opening 112a of lubricator connector 112 through which the lubricant may be supplied to chamber 114 of housing 110. In some embodiments, valve disc 122 may have a cone shape, and chamber 114 of housing 110 may include a cone shape receiving portion 114a adjacent to inlet opening 112a and mating with the cone shape of valve disc 122 (e.g., as shown in FIGS. 1B and 1C).

Valve insert 128 may be a hollow cylindrical body and may include an external thread 128a on its outer lateral surface and a central opening 128c. External thread 128a of valve insert 128 may mate with an internal thread 116g of tool connector 116 so that valve insert 128 may be screwed into an interior of tool connector 116. Central opening 128c of valve insert 128 may have a diameter sufficient to receive valve stem 124 and to provide flow of the lubricant therethrough.

When valve assembly 120 is assembled into housing 110, valve disc 122 may seal inlet opening 112a and valve spring 126 may surround valve stem 124 and extend between valve disc 122 and valve insert 128 (e.g., as shown in FIG. 1C). Valve spring 126 may be preloaded to control the supply of the lubricant from lubricator 80 into chamber 114 of housing 110 and to maintain the lubricant pressure in chamber 114 above the first pressure value if the lubricant is being supplied to chamber 114. For example, the first pressure value may range between 0.01-1 Bar, e.g., 0.3 Bar.

Various configurations of the housing, optionally without the valve assembly, may be used to maintain the lubricant pressure in the chamber above the first pressure value if the lubricant is being supplied to the chamber. For example, the chamber may be shaped so as to maintain the lubricant pressure in the chamber above the first pressure value if the lubricant is being supplied to the chamber while eliminating the need in the valve assembly (e.g. as described below with respect to FIGS. 2A, 2B, 2C and 2D).

In some embodiments, device 100 may include a pressure transducer 130 (e.g., as shown in FIG. 1A). Pressure transducer 130 may be configured to measure the lubricant pressure within chamber 114 of housing 110. In some embodiments, housing 110 may include an opening 118 in its lateral surface through which pressure transducer 130 may be inserted into chamber 114 (e.g., as shown in FIGS. 1B and 1C). Opening 118 may be sealed to prevent leak of the lubricant therethrough. Pressure transducer 130 may generate an output pressure signal indicative of the lubricant pressure in chamber 114 of housing 110.

In some embodiments, tool connector 116 of housing 110 may be configured to sense (e.g., continuously sense) ultrasonic waves/vibrations generated by tool 90. In some embodiments, tool connector 116 may be made of a metal material. In some embodiments, device 100 may include an ultrasonic waveguide 132 connected to tool connector 116 and configured to guide the ultrasonic waves/vibrations being sensed by tool connector 116 (e.g., as shown in FIG. 1A). In some embodiments, device 100 may include an ultrasonic transducer 134 connected to ultrasonic waveguide 132 and configured to generate an output ultrasonic signal indicative of the ultrasonic waves/vibrations being sensed by tool connector 116 of housing 110 (e.g., as shown in FIG. 1A).

In some embodiments, device 100 may include a controller 140. In various embodiments, controller 140 of device 100 may determine, based on the output pressure signal and/or based on the output ultrasonic signal, an abnormal lubrication of tool 90 by lubricator 80 and/or an abnormal operation of tool 90, respectively.

Controller 140 may, for example, determine, based on the pressure output signal, lack of lubricant supply from lubricator 80 if the pressure being measured in chamber 114 of housing 110 is below the first pressure value (e.g., the first pressure value defined by valve assembly 120 as described hereinabove). Controller 140 may, for example, determine, based on the pressure output signal, blockage of the lubricant fitting of tool 90 if the pressure being measured in chamber 114 of housing 110 is above a second pressure value. The second pressure value may be known and/or predefined. The second pressure value may, for example, be above 10 bar, e.g., 50 bar. Controller 140 may, for example, determine, based on the output pressure signal, abnormal lubricant pressure values being measured in chamber 114 of housing 110. Controller 140 may, for example, determine, based on the pressure output signal, an abnormal time variation pattern of the pressure being measured in chamber 114 of housing 110.

Controller 140 may, for example, determine, based on the output ultrasonic signal, abnormal amplitudes of the ultrasonic waves/vibrations being generated by tool 90. Controller 140 may, for example, determine, based on the output ultrasonic signal, an abnormal time variation pattern of the ultrasonic waves/vibrations being generated by tool 90.

In some embodiments, device 100 may include a communication unit 142. Communication unit 142 may, for example, send to one or more authorized third parties one or more notifications concerning the abnormal lubrication of tool 90 by lubricator 80 and/or the abnormal operation of tool 90.

As described hereinabove, maintaining of the lubricant pressure in chamber 114 of housing 110 at the first pressure value may be important for determination of lack of lubricant supply from lubricant 80 in some embodiments of the invention. In some embodiments, the first pressure value may be defined by a valve assembly that controls the supply of the lubricant into chamber 114 of housing 110 (e.g., as described above with respect to FIGS. 1B and 1C). In some other embodiments, the first pressure value may be determined based on pressure data including multiple lubricant pressure values measured in chamber 114 of housing 110 during a specified time interval.

For example, communication unit 142 may send to a remote computing device lubricant pressure values measured in chamber 114 of housing 110 during a specified time interval (e.g., few days, few weeks, etc.). The remote computing device may receive the multiple lubricant pressure values and generate pressure data related thereto. The remote computing device may determine the first pressure value based on the pressure data, for example using a pre-trained artificial intelligence (AI) model. The remote computing device may then send the first pressure value to communication unit 142. The first pressure value may be further used by controller 140 of device 100 as a reference for determining the lack of lubricant supply from lubricant 80 based on the output pressure signal. This may, for example, eliminate a need in a valve assembly in housing 110 of device 100 and simplify the structure of housing 110/device 100.

In some embodiments, device 100 may include one or more sensors 150 configured to measure one or more parameters and generate one or more sensor signals related thereto. One or more sensors 150 may, for example, include a temperature sensor, a vibration sensor (e.g., 3-axes vibration sensor), an accelerometer (e.g., 3-axes accelerometer), etc.

In some embodiments, device 100 may include a power source 160. In some embodiments, power source 160 includes one or more batteries. In some embodiments, power source 160 includes one or more rechargeable batteries. Power source 160 may supply power to electrical components (e.g., pressure transducer 130, ultrasonic transducer 134, controller 140, communication unit 142) of device 100.

In some embodiments, device 100 includes an energy power harvesting unit 170. Energy harvesting unit 170 may include a piezoelectric element 172. In some embodiments, piezoelectric element 172 may be connected to housing 110 and configured to deform in response to vibrations generated by tool 90 when housing 110 is connected to tool 90. In some embodiments, piezoelectric element 172 may be at least partly positioned within chamber 114 of housing 110 and may be configured to deform in response to the lubricant pressure within chamber 114. For example, piezoelectric element 172 may be inserted into chamber 114 of housing 110 via opening 118 or via a separate dedicated opening in housing 110. Piezoelectric element 172 may generate an electric charge in response to the deformation thereof. Energy harvesting unit 170 may include an electrical circuit 174 (e.g., an integrated circuit) connected to piezoelectric element 172 and to power source 160. Electrical circuit 174 may convert the electric charge generated by piezoelectric element 172 into a voltage to charge the rechargeable power source 160.

In various embodiments, the determination of the abnormal lubrication of tool 90 by lubricator 80 and/or the abnormal operation of tool 90 may be made external to device 100. For example, communication unit 142 may send the output pressure signal and/or the output ultrasonic signal to a remote computing device that may, for example, determine, based on the output pressure signal and/or based on the output ultrasonic signal, the abnormal lubrication of tool 90 by lubricator 80 and/or the abnormal operation of tool 90, respectively (e.g., as described below with respect to FIG. 3).

Advantageously, device 100 may be used with any one of manual lubricators, automatic lubricators, single point lubricators and/or centralized lubrication systems. Device 100 may provide compact, robust and cheap means for monitoring lubrication of tools containing moving parts and/or for continuous sensing of ultrasonic waves/vibrations generated by the tools.

Figure 2A:
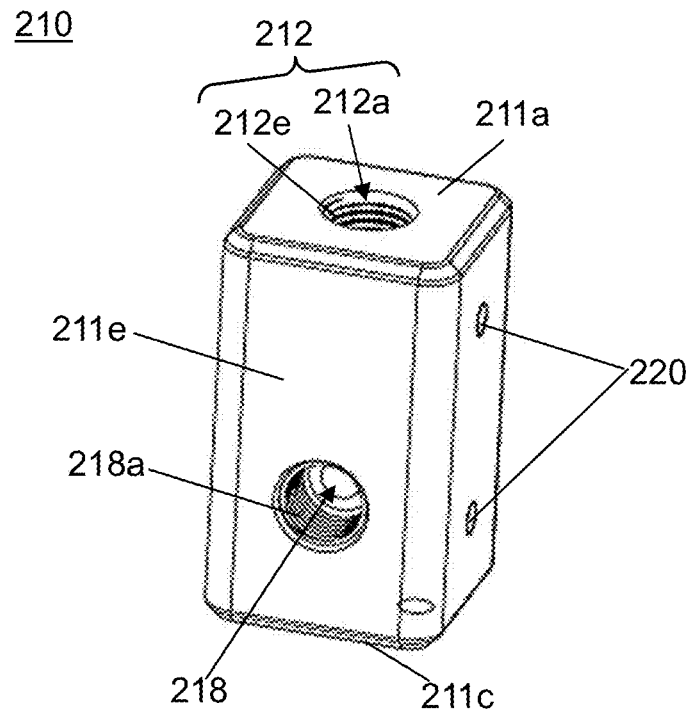
FIG. 2A is a three-dimensional (3D) diagram of a housing for the lubrication monitoring device, according to some embodiments of the invention.

Reference is now made to FIG. 2A, which is a 3D diagram of a housing 210 for a lubrication monitoring device, according to some embodiments of the invention.

Figure 2B:
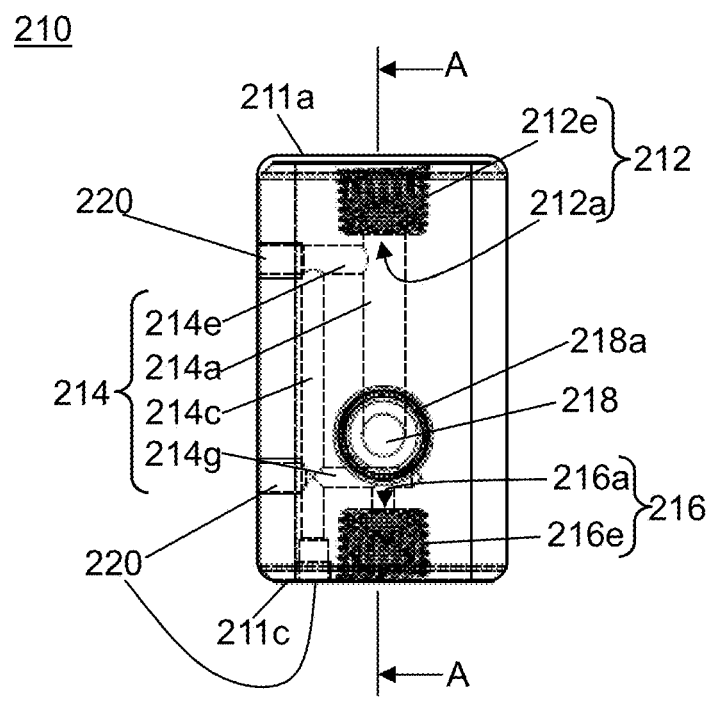
FIG. 2B is a side view of the housing of FIG. 2A, according to some embodiments of the invention.

Reference is also made to FIG. 2B, which is a side view of housing 210, according to some embodiments of the invention.

Figure 2C:
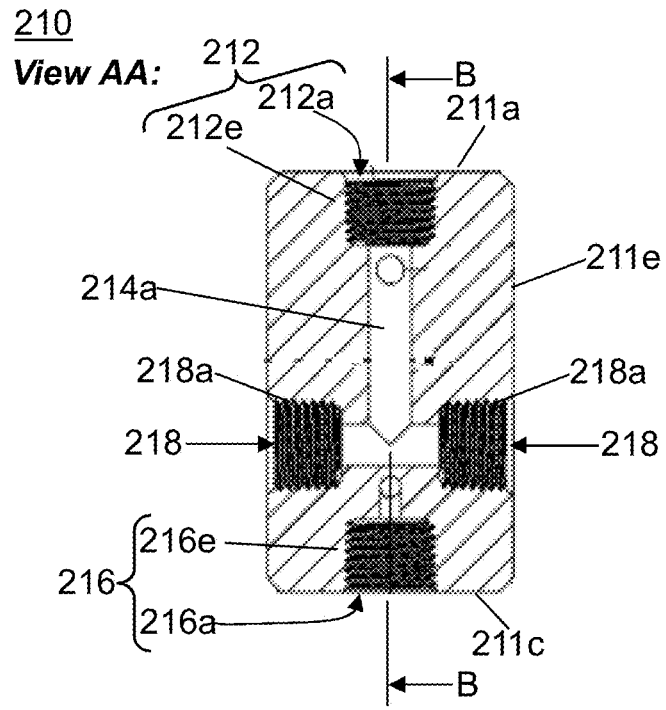
FIG. 2C is a sectional view of the housing along line AA of FIG. 2B, according to some embodiments of the invention.
Figure 2D:
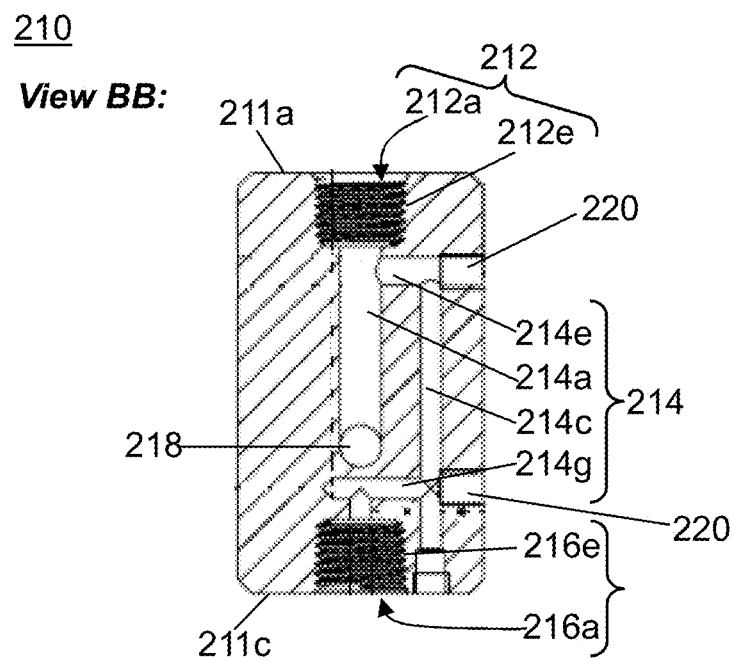
FIG. 2D is a sectional view of the housing along line BB of FIG. 2C, according to some embodiments of the invention.

Reference is also made to FIG. 2C, which is a sectional view of housing 210 along line AA of FIG. 2B, according to some embodiments of the invention, Reference is also made to FIG. 2D, which is a sectional view of housing 210 along line BB of FIG. 2C, according to some embodiments of the invention.

Housing 210 may be used in lubrication monitoring device 100 (e.g., instead of housing 110) as described above with respect to FIGS. 1A, 1B and 1C.

Housing 210 may include a lubricator connector 212. Lubricator connector 212 may be configured to connect housing 210 to lubricator 80. Lubricator connector 212 may include a lubricant inlet opening 212a, e.g., formed through a distal end (e.g. first end) 211a of housing 210. Lubricator connector 212 may include an internal thread 212e on the lateral surface of lubricant inlet opening 212a. Internal thread 212e may mate with an external thread on an outlet of lubricator 80 so lubricant 80 may be screwed into lubricator connector 212 of housing 210 to connect lubricant 80 to housing 210.

Housing 210 may include a chamber 214. Chamber 214 may receive a lubricant from lubricator 80 through lubricant inlet opening 212a of lubricator connector 212.

Housing 210 may include a tool connector 216. Tool connector 216 may be configured to connect housing 210 to a lubricant fitting 92 of a tool 90. Tool connector 216 may include a lubricant outlet opening 216a through which the lubricant may leave chamber 214 of housing 210. Tool connector 216 may include a lubricant outlet opening 216a, e.g. formed through a proximal end (e.g. second end) 211c of housing 210. Tool connector 216 may include an internal thread 216e on the lateral surface of lubricant outlet opening 216a. Internal thread 216e may mate with an external thread on an outlet of lubricant fitting 92 of tool 90 so housing 210 may be screwed onto lubricant fitting 92 of tool 90 to connect housing 210 to lubricant fitting 92 of tool 90.

Other suitable configurations of lubricant connector 212 and tool connector 216 may be used to connect housing 210 to lubricator 80 and lubricant fitting 92 of tool 90.

Housing 110 may include an opening 218, e.g. formed through respective a lateral surface 211e of housing 210, through which the pressure transducer (e.g. such as pressure transducer 130 described above with respect to FIGS. 1A, 1B and 1C) may be inserted into chamber 214. Opening 218 may, for example, include an internal thread 218a on the lateral surface of opening 218. Internal thread 218 may mate with an external thread on the pressure transducer so the pressure transducer may be screwed into opening 218. Housing 210 may, for example, include two (or more) openings 218 formed through opposing lateral surfaces 211e of housing 210 (e.g. as shown in FIG. 2C).

Chamber 214 of housing 210 may be shaped to maintain the lubricant pressure in chamber 214 above the first pressure value if the lubricant is being supplied to chamber 214 (e.g. the first pressure value as described above with respect to FIGS. 1A, 1B and 1C). For example, chamber 214 may include a plurality of channels formed through housing 210 and fluidically interconnecting lubricant inlet opening 214a, lubricant outlet opening 216a and opening(s) 218 through which the pressure transducer may be inserted into chamber 214. In the example of FIGS. 2A, 2B, 2C and 2D, chamber 214 includes: a first channel 214a extending through housing 210 from lubricant inlet opening 212a towards opening(s) 218; a second channel 214c being distanced from first channel 214a; a third channel 214e interconnecting second channel 214c and first channel 214a and a fourth channel 214g connecting second channel 214c to lubricant outlet opening 216a. Second channel 214c may be parallel (or substantially parallel) to first channel 214a. Third channel 214e and fourth channel 214g may be perpendicular (or substantially perpendicular) to first channel 214a and second channel 214c. Other suitable configurations of channels that form chamber 214 may be used to maintain the lubricant pressure in chamber 214 above the first pressure value if the lubricant is being supplied to chamber 214.

Holes 220 formed through walls of housing 210 may be caused by a machining tool (e.g. such as computer numerical control (CNC) tool). Holes 220 may be sealed to prevent the lubricant from leaking through holes 220.

Figure 3:
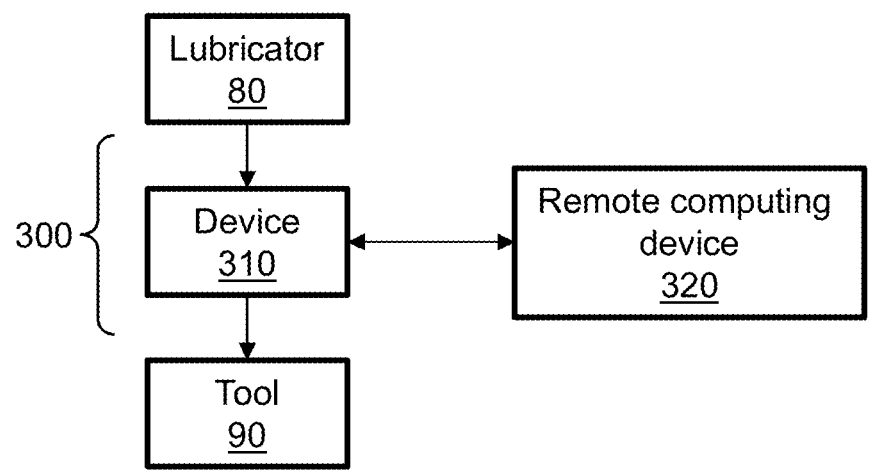
FIG. 3 is a block diagram of a lubrication monitoring system, according to some embodiments of the invention.

Reference is now made to FIG. 3, which is a block diagram of a lubrication monitoring system 300, according to some embodiments of the invention.

System 300 may include a device 310 for monitoring lubrication of a tool 90 by a lubricator 80 (e.g., such as device 100, e.g. with housing 110 with valve assembly 120 as described above with respect to FIGS. 1A, 1B and 1C or housing 210 as described above with respect to FIGS. 2A, 2B, 2C and 2D), and a remote computing device 320 (e.g., a server, a cloud, etc.).

Device 310 may be configured to be connected to lubricator 80 (e.g., as described above with respect to FIGS. 1A, 1B and 1C and FIGS. 2A, 2B, 2C and 2D). Device 310 may be configured to be connected to tool 90 (e.g., as described above with respect to FIGS. 1A, 1B and 1C and FIGS. 2A, 2B, 2C and 2D). Device 310 may be configured to receive a lubricant from lubricator 80, measure a pressure of a lubricant within device 310 and generate an output pressure signal related thereto (e.g., as described above with respect to FIG. 1A). In some embodiments, device 310 may be configured to sense (e.g., continuously sense) ultrasonic waves/vibrations generated by tool 90 and generate an ultrasonic output signal related thereto (e.g., as described above with respect to FIG. 1A). Device 310 may transmit the output pressure signal and/or the output ultrasonic signal to remote device 320 (e.g., as described above with respect to FIG. 1A).

Remote computing device 320 may determine an abnormal lubrication of tool 90 by lubricator 80 and/or an abnormal operation of tool 90 based on the output pressure signal and the output ultrasonic signal, respectively. In various embodiments, remote computing device 320 may determine the abnormal lubrication of tool 90 and/or the abnormal operation of tool 90 using one or more pre-trained artificial intelligence (AI) models. The one or more AI models may be pre-trained based on pressure data and/or ultrasonic data collected using device 310.

Remote computing device 320 may, for example, determine, based on the output pressure signal, a lack of the lubricant supply from lubricator 80. Remote computing device 320 may, for example, determine, based on the output pressure signal, a blockage of the lubricant fitting in tool 90. Remote computing device 320 may, for example, determine, based on the output pressure signal, abnormal values of the lubricant pressure being measured in device 310. Remote computing device 320 may, for example, determine, using the one or more AI models, an abnormal time variation pattern of the lubricant pressure being measured in device 310.

Remote computing device 320 may, for example, determine, based on the output ultrasonic signal, abnormal amplitudes of the ultrasonic waves/vibrations being sensed by device 310. Remote computing device 320 may, for example, determine, based on the output ultrasonic signal, an abnormal time variation pattern of the ultrasonic waves/vibrations being sensed by device 310.

In various embodiments, upon determination of the abnormal lubrication of tool 90 by lubricator 80 and/or the abnormal operation of tool 90, remote computing device 320 may send one or more respective notifications to one or more authorized parties.

In some embodiments, device 310 may be configured to measure one or more parameters and generate one or more output signals related thereto (e.g., as described above with respect to FIG. 1A). For example, device 310 may measure temperature, vibration, acceleration, etc. Device 310 may send the one or more output signals to remote computing device 320. Remote computing device 320 may determine, based on the one or more output signals, e.g., using the one or more AI models, one or more abnormal parameter values. The one or more AI models may be pre-trained based on, for example, temperature, vibration and/or acceleration data, etc. collected using device 310. In some embodiments, remote computing device 320 send to one or more authorized parties one or more notifications concerning the determination of the one or more abnormal parameter values.

In some embodiments, system 300 may include multiple devices such as device 310.

Figure 4:
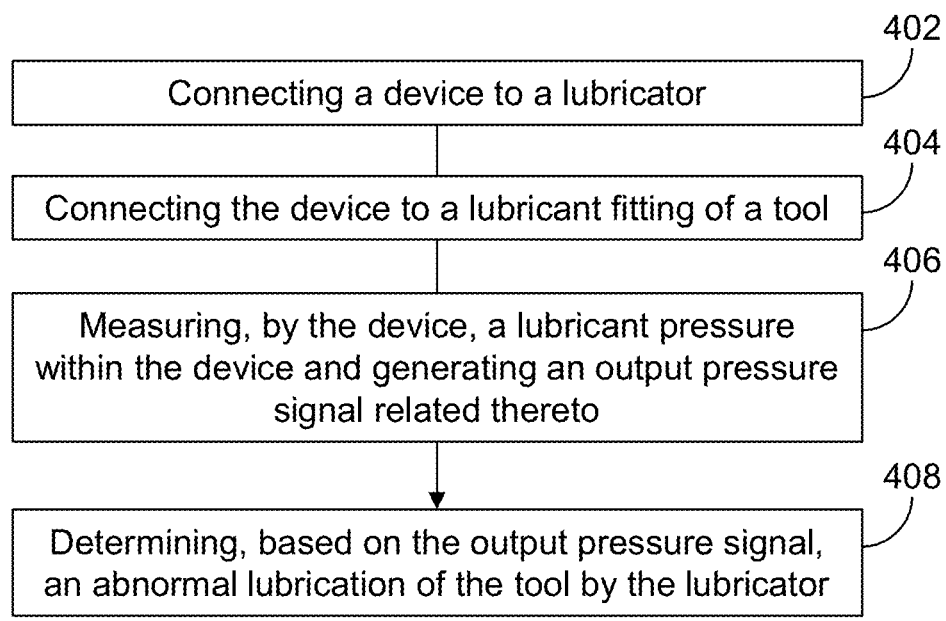
FIG. 4 is a flowchart of a method of monitoring a lubrication of a tool, according to some embodiments of the invention.

Reference is now made to FIG. 4, which is a flowchart of a method of monitoring a lubrication of a tool, according to some embodiments of the invention.

The method may include connecting, in step 402, a device to a lubricator. For example, the device may be device 100 (e.g. with housing 110 and valve assembly 120 as described above with respect to FIGS. 1A, 1B and 1C or with housing 210 as described above with respect to FIGS. 2A, 2B, 2C and 2D). The lubricator may be, for example, a manual lubricator or an automatic lubricator.

The method may include connecting, in step 404, the device to a lubricant fitting of a tool. For example, the tool may be any tool containing moving parts.

The method may include measuring, in step 406, by the device, a lubricant pressure within the device and generating an output pressure signal related thereto (e.g., as described above with respect to FIG. 1A).

The method may include determining, in step 408, based on the output pressure signal, an abnormal lubrication of the tool by the lubricator (e.g., as described above with respect to FIG. 1A and FIG. 3).

Some embodiments may include determining the abnormal lubrication of the tool by a controller of the device (e.g., by controller 140 as described above with respect to FIG. 1A).

Some embodiments may include sending, by the device, the output pressure signal to a remote computing device and determining the abnormal lubrication of the tool based on the output pressure signal by the remote computing device (e.g., as described above with respect to FIG. 3).

Some embodiments may include determining the abnormal lubrication of the tool by the lubricator based on the output pressure signal using one or more pre-trained AI models (e.g., as described above with respect to FIG. 3).

Some embodiments may include determining (e.g., either by the controller of the device or by the remote computing device), based on the output pressure signal, abnormal values of the lubricant pressure being measured by the device (e.g., as described above with respect to FIG. 1A and FIG. 3).

Some embodiments may include determining (e.g., either by the controller of the device or by the remote computing device), based on the output pressure signal, an abnormal time variation pattern of the lubricant pressure being measured by the device (e.g., as described above with respect to FIG. 1A and FIG. 3).

Some embodiments may include sensing (e.g., continuously sensing), by the device, ultrasonic waves/vibrations generated by the tool and generating an ultrasonic output signal related thereto. For example, the ultrasonic waves/vibrations generated by the tool may be sensed by tool connector 116 of housing 110 of device 100 as described above with respect to FIG. 1A. The output ultrasonic signal may be generated by ultrasonic transducer 134 based on the ultrasonic waves/vibrations being sensed by tool connector 116 and being guided to ultrasonic transducer 134 by ultrasonic waveguide 132 as described above with respect to FIG. 1A.

Some embodiments may include determining, based on the output ultrasonic signal, an abnormal operation of the tool (e.g., as described above with respect to FIGS. 1A and 3).

Some embodiments may include determining the abnormal operation of the tool by the controller of the device (e.g., as described above with respect to FIG. 1A).

Some embodiments may include sending, by the device, the output ultrasonic signal to the remote computing device and determining the abnormal operation of the tool based on the output ultrasonic signal by the remote computing device (e.g., as described above with respect to FIG. 3).

Some embodiments may include determining the abnormal operation of the tool based on the output ultrasonic signal using one or more pre-trained AI models (e.g., as described above with respect to FIG. 3).

Some embodiments may include determining (e.g., either by the controller of the device or by the remote computing device), based on the output ultrasonic signal, abnormal amplitudes of the ultrasonic waves/vibrations being sensed by the device (e.g., as described above with respect to FIG. 1A and FIG. 3).

Some embodiments may include determining (e.g., either by the controller of the device or by the remote computing device), based on the output ultrasonic signal, an abnormal time variation pattern of the ultrasonic waves/vibrations being sensed by the device (e.g., as described above with respect to FIG. 1A and FIG. 3).

Various embodiments may include sending to one or more authorized parties one or more notifications concerning the determination of the abnormal lubrication of the tool and/or the abnormal operation of the tool (e.g., as described above with respect to FIGS. 1A and 3). For example, the one or more notifications may be sent by the communication unit of the device or by the remote computing device.

Some embodiments may include measuring, by the device, one or more parameters and generating one or more signals related thereto (e.g., as described above with respect to FIGS. 1A and 3). For example, the one or more parameters, such as temperature, etc., may be measured by one or more sensors 150 of device 100 as described above with respect to FIG. 1A.

Some embodiments may include determining, based on the one or more output signals, one or more abnormal parameter values. For example, the one or more abnormal parameter values may be determined by the remote computing device, e.g., using one or more AI models. Some embodiments may include sending to one or more authorized parties one or more notifications concerning the determination of the one or more abnormal parameter values.

Some embodiments may include harvesting energy by the device from at least one of the lubricator and the tool to charge a rechargeable power source of the device (e.g., as described above with respect to FIG. 1A).

Figure 5:
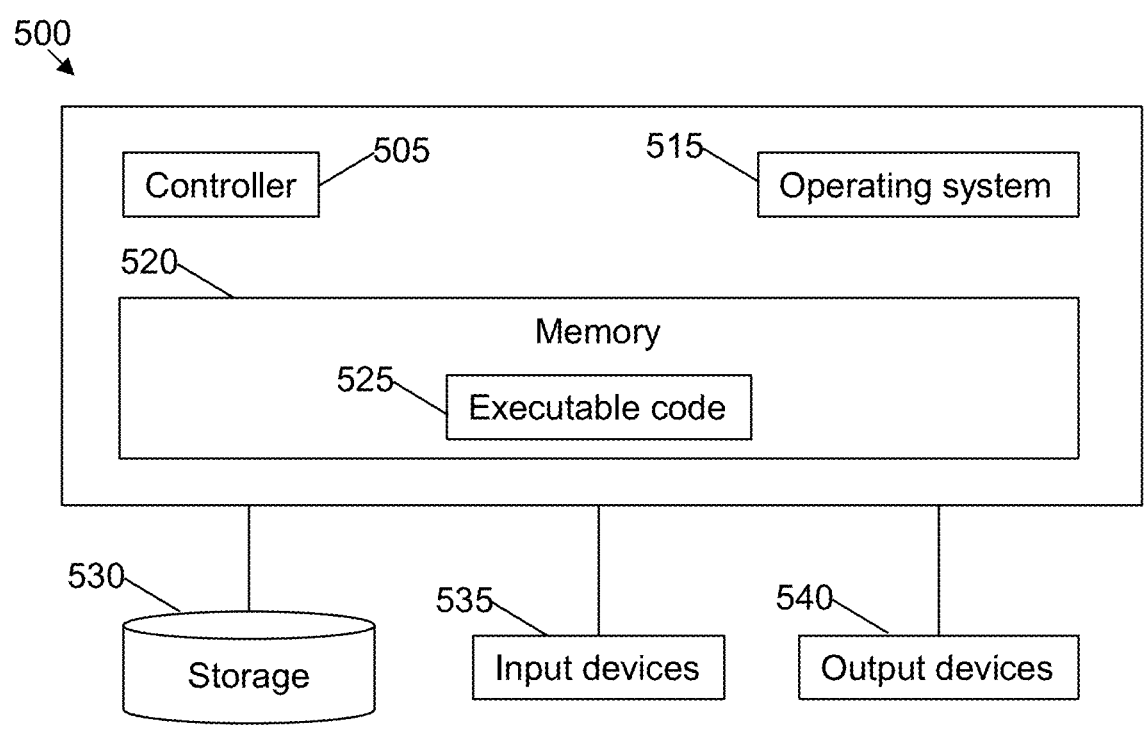
FIG. 5 is a block diagram of an exemplary computing device which may be used with embodiments of the present invention.

Reference is now made to FIG. 5, which is a block diagram of an exemplary computing device 500 which may be used with embodiments of the present invention.

Computing device 500 may include a controller or processor 505 that may be, for example, a central processing unit processor (CPU), a chip or any suitable computing or computational device, an operating system 515, a memory 520, a storage 530, input devices 535 and output devices 540.

Operating system 515 may be or may include any code segment designed and/or configured to perform tasks involving coordination, scheduling, arbitration, supervising, controlling or otherwise managing operation of computing device 500, for example, scheduling execution of programs. Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include a plurality of, possibly different, memory units. Memory 520 may store for example, instructions to carry out a method (e.g., code 525), and/or data such as user responses, interruptions, etc.

Executable code 525 may be any executable code, e.g., an application, a program, a process, task or script. Executable code 525 may be executed by controller 505 possibly under control of operating system 515. In some embodiments, more than one computing device 500 or components of device 500 may be used for multiple functions described herein. For the various modules and functions described herein, one or more computing devices 500 or components of computing device 500 may be used. Devices that include components similar or different to those included in computing device 500 may be used, and may be connected to a network and used as a system. One or more processor(s) 505 may be configured to carry out embodiments of the present invention by for example executing software or code. Storage 530 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 5 may be omitted.

Input devices 535 may be or may include a mouse, a keyboard, a touch screen or pad or any suitable input device. It will be recognized that any suitable number of input devices may be operatively connected to computing device 500 as shown by block 535. Output devices 540 may include one or more displays, speakers and/or any other suitable output devices. It will be recognized that any suitable number of output devices may be operatively connected to computing device 500 as shown by block 540. Any applicable input/output (I/O) devices may be connected to computing device 500, for example, a wired or wireless network interface card (MC), a modem, printer or facsimile machine, a universal serial bus (USB) device or external hard drive may be included in input devices 535 and/or output devices 540.

Embodiments of the invention may include one or more article(s) (e.g., memory 520 or storage 530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A device for monitoring a lubrication of a tool, the device comprising:
    a housing comprising:
        a lubricator connector configured to connect the housing to a lubricator and comprising a lubricant inlet opening,
        a chamber configured to receive a lubricant from the lubricator through the lubricant inlet opening, a tool connector configured to connect the housing to a lubricant fitting of a tool and comprising a lubricator outlet opening through which the lubricant leaves the chamber;

a pressure transducer configured to measure a lubricant pressure in the chamber of the housing and generate an output pressure signal related thereto;

a controller configured to:
determine, based on the output pressure signal, an abnormal lubrication of the tool by the lubricator;
determine, based on the output pressure signal, a lack of the lubricant supply from the lubricator if the lubricant pressure being measured in the chamber is below a predetermined first pressure value;

wherein the chamber comprises a plurality of channels formed through the housing and fluidically interconnecting the lubricant inlet opening, the lubricant outlet opening and an opening through which the pressure transducer is inserted into the chamber; and wherein the plurality of channels comprises:
a first channel extending through housing from the lubricant inlet opening towards the opening through which the pressure transducer is inserted into the chamber;
a second channel being substantially parallel to and distanced from the first channel;
a third channel being substantially perpendicular to and interconnecting the second channel and the first channel; and
a fourth channel being substantially perpendicular to the second channel and connecting the second channel to the lubricant outlet opening.

2. The device of claim 1, wherein the housing is configured to maintain the lubricant pressure in the chamber above the first pressure value if the lubricant is being supplied to the chamber.

3. The device of claim 1, wherein the housing comprises a valve assembly to control a supply of the lubricant into the chamber through the lubricant inlet opening and to maintain the lubricant pressure in the chamber above the first pressure value if the lubricant is being supplied to the chamber.

4. The device of claim 3, wherein the valve assembly comprises a spring-loaded valve, wherein a spring of the valve assembly is preloaded to control the supply of the lubricant into the chamber through the lubricant inlet opening and to maintain the lubricant pressure in the chamber above the first pressure value if the lubricant is being supplied to the chamber.

5. The device of claim 1, comprising a communication unit configured to:
send, to a remote computing device, multiple lubricant pressure values measured in the chamber of the housing during a specified time interval, and
receive, from the remote computing device, the first pressure value.

6. The device of claim 1, wherein the controller is configured to determine, based on the output pressure signal, a blockage of the lubricant fitting in the tool if the lubricant pressure being measured in the chamber is above a predetermined second pressure value.

7. The device of claim 1, wherein the controller is configured to determine, based on the output pressure signal, abnormal values of the lubricant pressure being measured in the chamber of the housing.

8. The device of claim 1, wherein the controller is configured to determine, based on the output pressure signal, an abnormal time variation pattern of the lubricant pressure being measured in the chamber of the housing.

9. The device of claim 1, further comprising a communication unit configured to send to one or more authorized parties one or more notifications concerning the determination of the abnormal lubrication of the tool.

10. The device of claim 1, wherein the tool connector of the housing is configured to sense ultrasonic waves/vibrations generated by the tool.

11. The device of claim 1, further comprising one or more additional sensors connected to the housing, the one or more additional sensors being configured to measure one or more parameters and generate one or more sensor signals related thereto.

12. The device of claim 1, further comprising:
a rechargeable power source to supply power to electrical components of the device, and
an energy harvesting unit to charge the rechargeable power source.

13. The device of claim 12, wherein the energy harvesting unit comprises:
a piezoelectric element connected to the housing and configured to:
deform in response to vibrations being generated by the tool, and
generate an electric charge related thereto, and
an electrical circuit connected to the piezoelectric element and to the power source and configured to convert the electrical charge to a voltage to recharge the power source.

14. A device for monitoring a lubrication of a tool, the device comprising:
a housing comprising:
a lubricator connector configured to connect the housing to a lubricator and comprising a lubricant inlet opening,
a chamber configured to receive a lubricant from the lubricator through the lubricant inlet opening,
a tool connector configured to connect the housing to a lubricant fitting of a tool and comprising a lubricator outlet opening through which the lubricant leaves the chamber, wherein the tool connector of the housing is configured to sense ultrasonic waves/vibrations generated by the tool;
a pressure transducer configured to measure a lubricant pressure in the chamber of the housing and generate an output pressure signal related thereto;
an ultrasonic waveguide connected to the tool connector and configured to guide the ultrasonic waves/vibrations being sensed by the tool connector, and
an ultrasonic transducer connected to the ultrasonic waveguide and configured to receive the ultrasonic waves/vibrations being sensed by the tool connector and generate an ultrasonic output signal related thereto.

15. The device of claim 14, further comprising a controller configured to determine, based on the output ultrasonic signal, an abnormal operation of the tool.

16. The device of claim 15, wherein the controller is configured to determine, based on the output ultrasonic signal, abnormal amplitudes of the ultrasonic waves/vibrations being generated by the tool.

17. The device of claim 15, wherein the controller is configured to determine, based on the output ultrasonic signal, an abnormal time variation pattern of the ultrasonic waves/vibrations being generated by the tool.

18. The device of claim 14, further comprising a communication unit configured to send to one or more authorized parties one or more notifications concerning the determination of the abnormal operation of the tool.

19. A device for monitoring a lubrication of a tool, the device comprising:
 a housing comprising:
  a lubricator connector configured to connect the housing to a lubricator and comprising a lubricant inlet opening,
  a chamber configured to receive a lubricant from the lubricator through the lubricant inlet opening,
  a tool connector configured to connect the housing to a lubricant fitting a tool and comprising a lubricator outlet opening through which the lubricant leaves the chamber;
 a pressure transducer configured to measure a lubricant pressure in the chamber of the housing and generate an output pressure signal related thereto;
 a rechargeable power source to supply power to electrical components of e device, and
 an energy harvesting unit to charge the rechargeable power source;
 wherein the energy harvesting unit comprises:
  a piezoelectric element at least partly positioned the chamber of the housing and configured to:
   deform in response to the lubricant pressure within the chamber, and
   generate an electric charge related thereto, and
  an electrical circuit connected to the piezoelectric element and to the power source and configured to convert the electrical charge to a voltage to recharge the power source.

* * * * *